(12) United States Patent
Lemoult et al.

(10) Patent No.: US 10,279,777 B2
(45) Date of Patent: May 7, 2019

(54) IMMOBILISER SYSTEM WITH CONTROLLABLE INHIBITING MEANS

(71) Applicant: EILEO, Paris (FR)

(72) Inventors: Thierry Lemoult, Chelles (FR); Thierry Lucet, Paris (FR)

(73) Assignee: EILEO, Paris (FR)

(*) Notice: Subject to any disclaimer, the term of this patent is extended or adjusted under 35 U.S.C. 154(b) by 217 days.

(21) Appl. No.: 14/891,591

(22) PCT Filed: May 13, 2014

(86) PCT No.: PCT/EP2014/059761
§ 371 (c)(1),
(2) Date: Nov. 16, 2015

(87) PCT Pub. No.: WO2014/187700
PCT Pub. Date: Nov. 27, 2014

(65) Prior Publication Data
US 2016/0107610 A1  Apr. 21, 2016

(30) Foreign Application Priority Data
May 22, 2013  (EP) .................................. 13305660

(51) Int. Cl.
B60R 25/24  (2013.01)
B60R 25/04  (2013.01)
(Continued)

(52) U.S. Cl.
CPC ............. B60R 25/24 (2013.01); B60R 25/04 (2013.01); E05B 81/56 (2013.01); E05B 81/64 (2013.01);
(Continued)

(58) Field of Classification Search
CPC . B60R 25/24; B60R 25/04; E05B 2047/0048; E05B 2047/0067;
(Continued)

(56) References Cited

U.S. PATENT DOCUMENTS 6,429,768 B1  8/2002  Flick
6,781,507 B1  8/2004  Birchfield et al.
(Continued)

FOREIGN PATENT DOCUMENTS

FR  2915839  7/2008
GB  2450154  12/2008

OTHER PUBLICATIONS

International Search Report from International Patent Application No. PCT/EP2014/059761, dated Jun. 17, 2014.
(Continued)

Primary Examiner — Joseph H Feild
Assistant Examiner — Sharmin Akhter
(74) Attorney, Agent, or Firm — Greer, Burns & Crain, Ltd.

(57) ABSTRACT

An immobilizer system for a vehicle and an immobilizer set including an immobilizer system and a switch key equipped with a transponder is provided. The immobilizer system includes:
a native transmitter-receiver unit integrated into the vehicle, the native transmitter-receiver unit including a native antenna and being configured so as to enable a wireless communication with a transponder associated with a switch key, and
a locking device for allowing or preventing the wireless communication between the native transmitter-receiver unit and the transponder, the locking device including:
a locking antenna arranged in the vicinity of the native antenna, and
(Continued)

a control unit configured to control the locking antenna in an enabled state, wherein the locking antenna does not interfere with the wireless communication between the native transmitter-receiver unit and the transponder, or in a locking state, wherein the locking antenna does interfere with the wireless communication.

13 Claims, 3 Drawing Sheets

(51) Int. Cl.
    *G07C 9/00*     (2006.01)
    *E05B 81/56*     (2014.01)
    *E05B 81/64*     (2014.01)
    *H04K 3/00*     (2006.01)
    *E05B 47/00*     (2006.01)

(52) U.S. Cl.
    CPC ........... *G07C 9/00309* (2013.01); *H04K 3/41* (2013.01); *H04K 3/68* (2013.01); *E05B 2047/0048* (2013.01); *E05B 2047/0067* (2013.01); *E05B 2047/0072* (2013.01); *E05B 2047/0088* (2013.01); *G07C 9/00571* (2013.01); *G07C 2209/08* (2013.01); *H04K 3/42* (2013.01); *H04K 2203/22* (2013.01)

(58) Field of Classification Search
    CPC ..... E05B 2047/0072; E05B 2047/0088; E05B 81/56; E05B 81/64; G07C 9/00571; G07C 2209/08; G07C 9/00309; H04K 2203/22; H04K 3/41; H04K 3/68

USPC ........................ 340/5.7–5.85, 426.11–426.17, 340/426.3–426.36, 541, 542
See application file for complete search history.

(56) References Cited

U.S. PATENT DOCUMENTS

| | | | |
|---|---|---|---|
| 7,233,227 B2 | 6/2007 | Lemoult | |
| 8,370,268 B2 | 2/2013 | Ehrman et al. | |
| 2001/0028295 A1 | 10/2001 | Brinkmeyer et al. | |
| 2006/0214766 A1* | 9/2006 | Ghabra | G07C 9/00309 340/5.25 |
| 2008/0268768 A1* | 10/2008 | Brown | H04K 3/415 455/1 |
| 2013/0082820 A1* | 4/2013 | Tieman | G07C 9/00309 340/5.61 |
| 2013/0207781 A1* | 8/2013 | Pagani | G06K 7/10178 340/10.1 |
| 2014/0118116 A1* | 5/2014 | Lavedas | H01Q 1/2225 340/10.3 |
| 2014/0320261 A1* | 10/2014 | Davis | G06K 7/10227 340/5.61 |
| 2016/0344101 A1* | 11/2016 | Ghabra | H01Q 1/38 |
| 2016/0349375 A1* | 12/2016 | Littlefield | G01S 19/03 |

OTHER PUBLICATIONS

European Search Report from Corresponding European Patent Application No. 13305660.6, dated Sep. 19, 2013.

* cited by examiner

IMMOBILISER SYSTEM WITH CONTROLLABLE INHIBITING MEANS

BACKGROUND

The present invention relates to an immobiliser system for a vehicle. It also relates to an immobiliser set comprising an immobiliser system and a switch key equipped with a transponder. The invention finds a particularly advantageous, but not exclusive, application in the management of a fleet of vehicles, for example for a car rental company.

In order to simplify the way of renting a vehicle, rental companies are largely implementing reservation systems via Internet or telephone. Such a reservation system may provide a user with an access code so as to unlock the vehicle. The access code may be entered via a keyboard placed on the outside of the vehicle or behind the windscreen. The user is so enabled to get into the vehicle, where the switch key may be left for starting the vehicle. Instead of an access code, regular users may be provided with an RFID card upon registration. The RFID card can then be "activated" on demand through the reservation system, so that when it is identified by a card reader mounted on the vehicle, it unlocks the vehicle. This reservation process shows obvious disadvantages as regards the security of the vehicle. Indeed, the switch key is left in the vehicle and an unauthorised person or a thief can break the lock of the vehicle and start the vehicle without any difficulty, even if the vehicle is equipped with a conventional immobiliser system.

A conventional immobiliser system, also known as an anti-theft security system, comprises a transmitter-receiver unit and a control unit. The transmitter-receiver unit is integrated near the ignition lock of the vehicle and can transmit an electromagnetic signal to a transponder integrated in the switch key. Said electromagnetic signal powers the transponder, which returns an answer signal containing an identification code. This code is generally stored in an electronic tag, for example an RFID tag, of the transponder. It is received by the transmitter-receiver unit and processed by the control unit for checking its validity and, if appropriate, for authorising the starting of the vehicle. The identification code can be encrypted in a variety of ways.

Some security systems have been developed for car rental applications. However, these security systems are not entirely satisfactory. As an example, document US 2001028295 describes an electronic key equipped with an intelligent system for receiving user "credits" from a control centre. The electronic key communicates bi-directionally with the vehicle. The latter has an electronic system in order to verify, from data contained in the electronic key, whether the user and his "credits" are valid and, if appropriate, to authorise the starting of the vehicle. However, such a system involves an electronic key containing additional functionalities. Such a customised switch key is obtained by substituting the original switch key with a dedicated switch key. One difficulty is to fit the switch key with an identification code that is accepted by the immobiliser system. In practice, the dedicated switch key is associated with the immobiliser system through an association process. This process is time consuming and generally implies the intervention of the car manufacturer. An additional drawback of this solution is that the switch keys are subjected to many shocks and can be easily damaged. Last but not least, the cost of the customised switch key is much greater in comparison with the original switch key.

Document FR 2 848 951 discloses another security system developed for car rental applications. The security system comprises, in a usual manner, an immobilising transponder integrated into the vehicle, and an electronic label intended to communicate with the transponder. However, the electronic label is integrated into the vehicle far enough away from the transponder so as to prevent any direct electromagnetic coupling. A passive relay is so provided so as to enable setting up or interrupting the communication between the transponder and the electronic label. The passive relay includes a first antenna close to the transponder, a second antenna close to the electronic label, and an electrical connection equipped with a switch for connecting the two antennas. This security system is well adapted for authorising the starting of the vehicle from a remote server. However, it suffers from the need to dismantle the original key to get the electronic label. Hence, there is a risk that the original key would be damaged during its dismantling. This entails a loss of value of the vehicle for the resale.

It is also known, from document U.S. Pat. No. 6,781,507, a remote starting system for a vehicle comprising a passive anti-theft security system. This remote starting system is not dedicated to a car rental application, but aims at enabling a user to remotely operate a vehicle. The system comprises a first coil arranged close to the ignition lock, a first transponder arranged in the switch key, a second transponder, similar to the first one, arranged in the vehicle close to the first coil, and a second coil wound around the second transponder. The second transponder may be used for starting the vehicle in the absence of the switch key. However, in order to maintain the functionality of the anti-theft security system, the second coil is closed via a relay. This has the effect of blocking the electromagnetic coupling between the second transponder and the first coil. When the vehicle is to be remotely started, the relay is opened, which allows the first coil to transmit a signal to the second transponder. The second transponder responds by sending an authorisation code to the first coil, thus allowing the starting of the vehicle. The invention described in document U.S. Pat. No. 6,781,507 does not alter the integrity of the anti-theft security system. However, it could not be adapted for a car rental application, insofar as it does not allow to remotely prevent the starting of the vehicle for a user in possession of the switch key.

SUMMARY

One aim of the invention is to alleviate at least part of the aforementioned drawbacks by proposing a security system adapted to a car rental company, whose installation is entirely reversible and does not damage the vehicle or the switch key. The invention especially aims at preventing any cable cutting or dismantling of the key. Another aim of the invention is to propose a security system with improved security. Still another aim of the invention is to propose a security system which can be driven according to access authorisation data sent from a remote server, and in particular in the context of a car rental system.

At least one of the above objectives is achieved through an immobiliser system for a vehicle comprising a transmitter-receiver unit integrated in a vehicle and enabling a wireless communication with a key transponder of a switch key. The key transponder may comprise an electronic tag for allowing the transmitter-receiver unit to identify the switch key. In accordance to the invention, the immobiliser system further comprises a locking device enabling to block the wireless communication and so to prevent the identification of the key. More precisely, the object of the invention is an immobiliser system for a vehicle comprising:

a native transmitter-receiver unit integrated into the vehicle, said transmitter-receiver unit including a native antenna and being configured so as to enable a wireless communication with a key transponder associated with a switch key, a locking device for allowing or preventing the wireless communication between the native transmitter-receiver unit and the key transponder, said locking device comprising:

a locking antenna arranged in the vicinity of the first antenna, and a control unit configured to control the locking antenna in an enabled state, wherein the locking antenna does not interfere with the wireless communication between the native transmitter-receiver unit and the key transponder, or in a locking state, wherein the locking antenna does interfere with said wireless communication.

The locking device may interfere with the wireless communication either by acting as an electromagnetic shield between the native transmitter-receiver unit and the key transponder, or by generating jamming signals.

In a particular embodiment, the locking antenna comprises a coil having two terminal ends, and the control unit comprises a controlled switch connecting said terminal ends and a driving means for controlling the controlled switch in an open state or in a close state. The coil of the locking antenna may be configured so as to act as an electromagnetic shield between the native antenna and the transponder when the controlled switch is in the close state.

The transponder may be configured so as to enable the transmission of an amplitude modulated signal to the native transmitter-receiver unit. The signal is modulated according to a modulating signal, which may characterise identification data enclosed in the transponder of the switch key. In case of an amplitude modulated signal, the control unit may be configured so as to close the controlled switch at a frequency substantially equal to a frequency of the modulating signal. The modulating signal typically shows a frequency lying in the range between about 2 kHz and about 10 kHz.

The driving means for controlling the controlled switch are preferably operated through an authorisation signal. To this end, the locking device of the immobiliser system may comprise a decision unit for generating this authorisation signal. By way of example, the decision unit comprises:

a user interface enabling a user of the vehicle to input an access authorisation datum, and a processing unit for generating the authorisation signal as a function of the access authorisation datum.

In this case, the driving means of the control unit are configured to receive the authorisation signal and to control the controlled switch as a function of this authorisation signal.

In a particular embodiment, the control unit and the decision unit are spaced apart. This makes possible to miniaturise the control unit and to make it less visible. The control unit and the decision unit may be connected through an electrical connection or a wireless connection. In the latter case, the decision unit further comprises a wireless transmitter for transmitting the authorisation signal, and the control unit further comprises a wireless receiver for receiving the authorisation signal.

The user interface of the decision unit may comprise a keypad enabling the user to enter an authorisation code, and/or a contactless card reader capable of reading an access datum stored in a user card. The authorisation code and the access datum constitute access authorisation data for the generation of the authorisation signal. The contactless card reader may be an RFID reader or an NFC reader.

In a specific embodiment of the invention, the decision unit further comprises a wireless receiver able to receive an access datum from a remote server. The processing unit so generates the authorisation signal as a function of this access datum. This embodiment is particularly well suited for a car rental application, insofar as the authorisation for using a vehicle can be managed from the remote server.

The locking antenna may comprise a locking coil wound around at least part of the native antenna. This configuration provides an efficient interaction of the locking antenna onto the native antenna. More particularly, the native antenna may comprise a native coil. The locking coil of the locking antenna is so wound around at least part of the native coil.

By way of example, the native antenna of the native transmitter-receiver unit and the locking antenna of the locking device may be loop antennas.

Another object of the invention is to provide an immobiliser set for a vehicle. The set comprises an immobiliser system according to the invention and a switch key. In a specific embodiment, the switch key includes a transponder enabling a wireless communication with the native transmitter-receiver unit of the immobiliser system. According to an important aspect of the invention, the switch key can be the original one. In other words, the switch key of the native immobiliser system does not need any modification.

The invention offers the advantage of enabling to switch between a conventional mode of using the vehicle, wherein the locking device is inoperative, to an automatic rental mode, wherein the locking device is driven according to specific conditions, without the requirement of changing the switch key.

BRIEF DESCRIPTION OF THE DRAWINGS

Other advantages and characteristics of the invention will become apparent on examination of the detailed description of exemplary embodiments, which are in no way limitative, and in view of the following drawings, in which.

DETAILED DESCRIPTION

The following embodiments are described for illustrative purposes only and cannot be considered as limiting the invention to the particular forms, features, and combinations thereof. On the contrary, it should be understood that the invention should cover all modifications, equivalents and alternatives falling within the scope of the present invention as defined in the appended claims. In particular, one can consider alternatives of the invention comprising only a selection of described features, which are described in association to other features (even if this or those selected features are isolated within a sentence comprising the other features), in case this selection of features is sufficient to confer a technical advantage or to differentiate the invention with respect to the state of prior art. The selection comprises at least one—preferably functional—feature, without structural details, or with only part of the structural details if only this part is sufficient to provide a technical advantage or to differentiate the invention with respect to the state of prior art.

Figure 1:
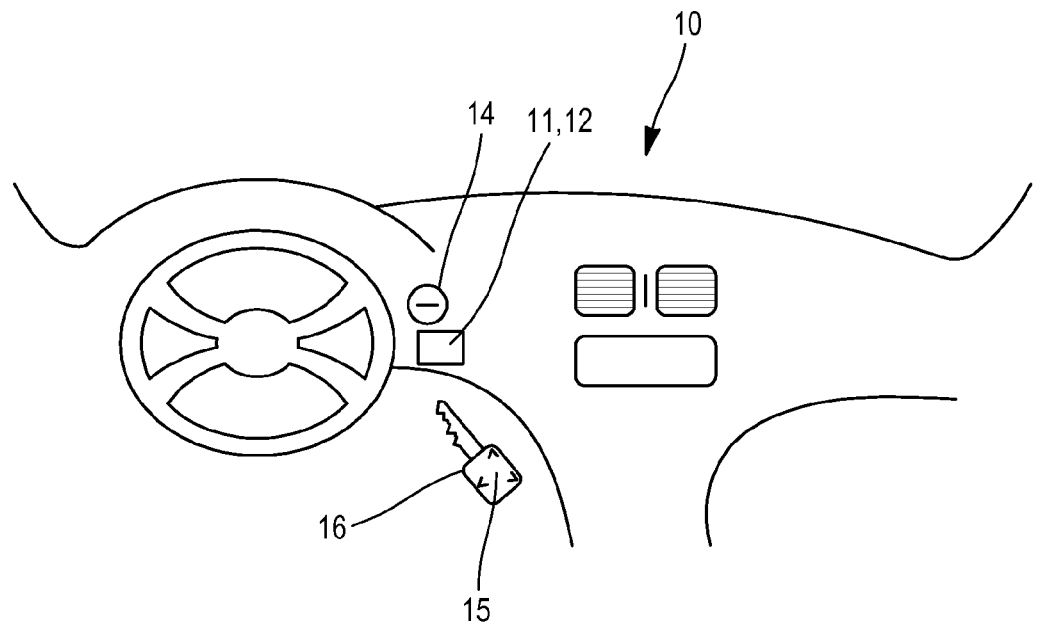
FIG. 1 schematically represents a vehicle equipped with an immobiliser system according to the prior art.

FIG. 1 schematically represents an interior of a vehicle equipped with an immobiliser system according to the prior art. The immobiliser system 10 comprises a transmitter-receiver unit 11, an electronic unit 12, and an immobilisation means, not represented. The transmitter-receiver unit 11 is arranged in the vicinity of the ignition lock 14 of the vehicle. It is configured to wirelessly communicate with a transponder 15 arranged in a switch key 16 of the vehicle, when the transponder 15 is sufficiently close to the transmitter-receiver unit 11. This occurs in particular when the switch key 16 is inserted in the ignition lock 14. The transponder 15 may integrate an electronic tag containing identification data, such as a code, for identifying the switch key 16. The transponder 15 is powered by an electromagnetic field generated by the transmitter-receiver unit 11, and responds by sending a radiofrequency signal containing the identification data. The transmitter-receiver unit 11 transmits the identification data to the electronic unit 12, which checks for its validity. In case of valid identification data, the electronic unit 12 drives the immobilisation means for authorising the starting of the vehicle.

Figure 2:
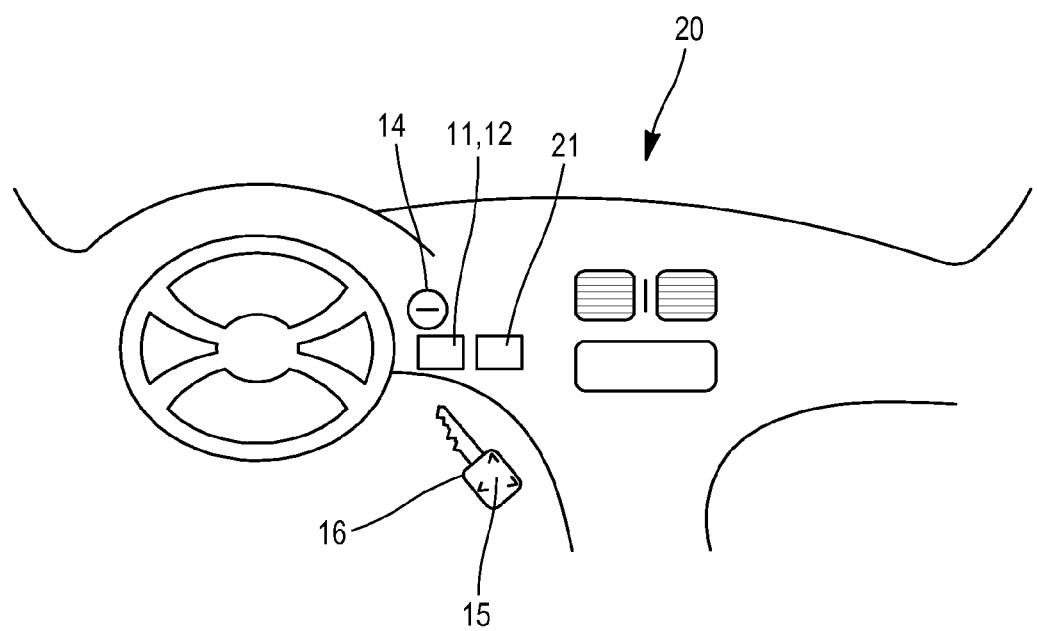
FIG. 2 schematically represents a vehicle equipped with a first exemplary embodiment of an immobiliser system according to the invention.
Figure 3:
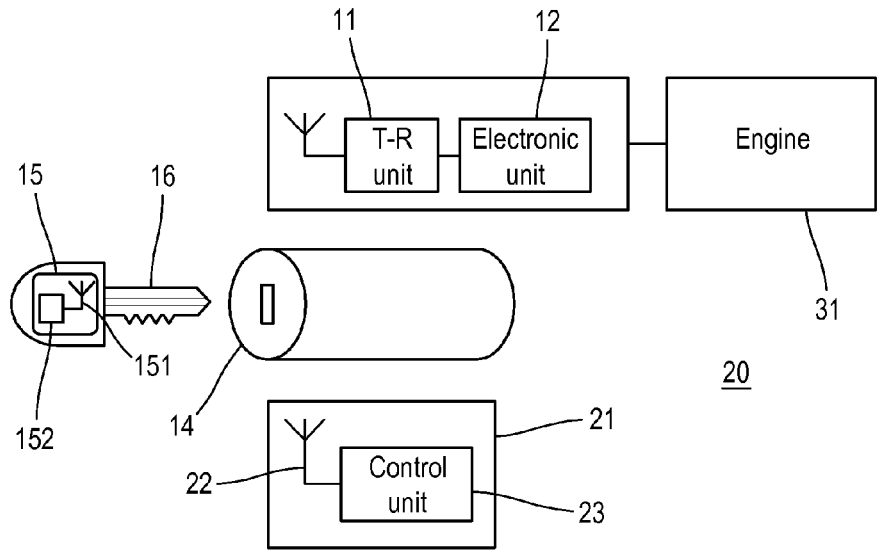
FIG. 3 represents, by a simplified block diagram, the principle elements of the immobiliser system of FIG. 2.
Figure 4:
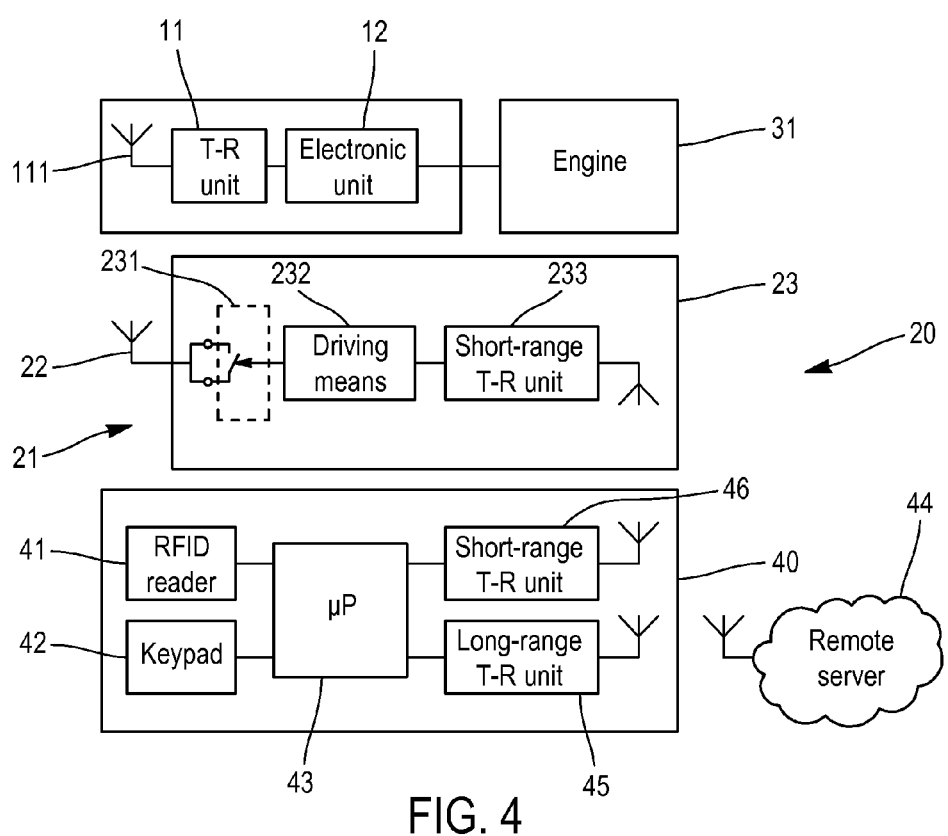
FIG. 4 represents, by a more detailed block diagram, the principle elements of the immobiliser system of FIG. 2.

FIGS. 2 to 4 illustrate a first embodiment of an immobiliser system according to the invention. FIG. 2 schematically represents an interior of a vehicle equipped with this immobiliser system. FIGS. 3 and 4 represent the principle elements of the immobiliser system, by a simplified block diagram, and by a more detailed block diagram, respectively.

We first refer to FIG. 2. Similarly to the immobilisation system 10 of the prior art, the immobiliser system 20 according to the invention comprises a transmitter-receiver unit 11, an electronic unit 12, and an immobilisation means, not represented. These components are qualified as native components of the immobiliser system 20. The native transmitter-receiver unit 11 is integrated into the vehicle, preferably in the vicinity of the ignition lock 14. It is configured to wirelessly communicate with a transponder 15 associated with a switch key 16 of the vehicle. According to the invention, the switch key 16 can be an original key of the vehicle, that is to say a switch key dedicated to be used with a conventional immobiliser device, as described with reference to FIG. 1. As can be seen on FIG. 3, the transponder 15 of the switch key 16 may comprise an antenna, called a key antenna 151, and an electronic tag 152, for example a Radio Frequency Identification (RFID) tag, or a Near Field Communication (NFC) tag. The electronic tag 152 contains identification data, such as an identification code, for identifying the switch key 16. The transponder 15 may be arranged within the casing of the switch key 16, or it may be attached to the key. The native transmitter-receiver unit 11 comprises an antenna, called a native antenna 111, enabling an RF communication with the transponder 15. The native antenna 111 is for example a loop antenna. In a particular embodiment, the transmitter-receiver unit 11 first sends a radiofrequency (RF) signal through its antenna 111 to the transponder 15. This signal constitutes a request signal, to which the transponder 15 answers by sending an RF return signal containing the identification data. This return signal is received by the transmitter-receiver unit 11, which transfers the identification data to the electronic unit 12. In case of an RFID tag, the request signal normally powers the transponder 15. The RF communication may operate at frequencies within the range between about 100 kHz and about 150 kHz. Typical values are 125 kHz, 138 kHz and 150 kHz. The electronic unit 12 processes the identification data in order to verify that the switch key 16 is authorised to start the vehicle. The verification operation may consist in comparing the identification code to a reference code stored in the electronic unit 12. If the identification code matches with the reference code or, more generally, if the identification data are valid, the electronic unit 12 sends a start authorisation signal to the immobilising means for authorising the starting of the vehicle and, especially, the starting of the engine 31. On the contrary, if the identification data are not valid, the start authorisation signal is not sent. Alternatively, a prohibiting signal may be sent. In any case, the electronic unit 12 must prevent the vehicle to be started.

In a specific embodiment, the identification data are encrypted for the RF transmission between the transponder 15 and the native transmitter-receiver unit 11. Any type of encryption technology can be used. By way of example, the encryption can rely on a public-key cryptographic system. In particular, the identification data can be encrypted with a private key before its transmission, and deciphered with a public key on the transmitter-receiver unit side. The identification data so constitute a digital signature and enable the authentication of the switch key 16.

The immobiliser system 20 according to the invention further comprises a locking device 21. The locking device 21 is dedicated to allow or to prevent the RF communication between the transmitter-receiver unit 11 and the transponder 15. It constitutes a controllable inhibiting means for this RF communication. According to a main aspect of the invention, the locking device 21 only intervenes in the RF communication between the transmitter-receiver unit 11 and the transponder 15. It does not modify the physical configuration of the original elements of the immobiliser system 20, that is to say the transmitter-receiver unit 11, the electronic unit 12, the immobilisation means, and the transponder 15. In particular, the locking device 21 does not require to be electrically connected to an original element of the immobiliser system 20, or to alter its integrity. The locking device 21 interferes with the RF communication. It may either generate a jamming RF signal, or inhibit the RF signals between the transmitter-receiver unit 11 and the transponder 15. The following description considers the locking device 21 to inhibit the RF signals. Nevertheless, it is to be understood that the invention is not limited to this particular embodiment.

The locking device 21 comprises an antenna, named a locking antenna 22 and a control unit 23. The locking antenna 22 is for example a loop antenna. Such an antenna comprises a coil of turns having two terminal ends. By way of example, the coil may comprise between about 10 and about 200 turns of a copper bare wire. In a preferred embodiment, the locking antenna 22 of the locking device 21 is arranged in the close vicinity of the native antenna 111 of the transmitter-receiver unit 11. The native antenna 111 is usually wound around the ignition lock 14 of the vehicle. The locking antenna 22 can so be wound around the native antenna 111. In order to make the locking device 21 as discreet as possible, the locking antenna 22 may be wrapped within a special casing, resembling the original casing of the native antenna 111. The locking device 21 would so be not visible to a thief. In case the two terminal ends of the locking antenna 22 are in a closed circuit position, the locking antenna 22 forms an electromagnetic shield between the native antenna 111 and the key antenna 151 of the transponder 15. The phrase "electromagnetic shield" must be understood as a means for inhibiting or at least attenuating the amplitude of the electromagnetic coupling between the native transmitter-receiver unit 11 and the transponder 15. The amplitude of the electromagnetic coupling must be attenuated enough to block the communication between the transponder 15 and the transmitter-receiver unit 11. In a particular case, the transmitter-receiver unit 11 must be prevented from demodulating signals coming from the transponder 15. It is to be noted that the locking antenna 22 is entirely passive, in a sense that it is not supplied with electrical power.

We now refer more specifically to FIG. 4. The control unit 23 comprises a controlled switch 231, and a driving means 232 for controlling the controlled switch 231 according to an authorisation signal. The controlled switch can for example be a relay, a MOSFET transistor or any other type of switch that can be controlled by a signal. The driving means 232 is for example a microcontroller. The authorisation signal for driving the controlled switch 231 may be generated in a decision unit 40. The decision unit 40 may form part of the locking device 21. It comprises at least an interface for inputting access authorisation data and processing means for processing these data. By way of example, the decision unit 40 comprises an RFID reader 41, a user keypad 42, and a microprocessor 43. The RFID reader can be used for reading an RFID tag, and the keypad 42 for inputting an access code. In the context of a car rental system, an authorised user may be provided with an RFID card containing a user identification code and/or with the access code. These codes are processed by the microprocessor 43 for generating the authorisation signal for the driving means 232. The microprocessor 43 may also receive access authorisation data from a remote server 44. This server 44 may operate a car rental application for managing a fleet of vehicles. In particular, it may provide the microprocessor 43 with authorised user identification codes and/or authorised access codes. The communication between the remote server 44 and the decision unit 40 is preferably carried out via a wireless communication mode, such as for example a General Packet Radio Service (GPRS), a Universal Mobile Telecommunication System (UMTS), a Bluetooth technology or a Wi-Fi technology. To this end, the decision unit 40 comprises a transmitter-receiver unit, called a long range transmitter-receiver unit 45. Since the decision unit 40 may only receive data, the long range transmitter-receiver unit 45 may be substituted by a simple receiver unit.

In view of achieving a locking device 21 as discrete as possible, the decision unit 40 is preferably arranged away from the control unit 23. It may for example be arranged in a housing dedicated to receive a car radio, in a glove compartment of the vehicle, or in a car trunk of the vehicle. The control unit 23 can so be made relatively small. The decision unit 40 can be connected to the control unit 23 via an electrical connection. However, a wireless communication means is preferred in order to render it invisible to a thief. Hence, the control unit 23 comprises a transmitter-receiver unit, called a short range transmitter-receiver unit 233, and the decision unit 40 comprises an associated short range transmitter-receiver unit 46. These transmitter-receiver units 233, 46 are qualified as short range in the meaning that the communication must only be enabled between two points of the interior of the vehicle. As a consequence, a wireless communication with a range of a few meters, for example between about 1 m and about 5 m, is sufficient. The wireless communication is for example carried out via a Wi-Fi technology, a Bluetooth technology or a ZigBee technology. In a simplified embodiment, the control unit 23 may comprise a receiver and the decision unit a transmitter. Such a configuration enables the authorisation signal to be transferred from the decision unit 40 to the control unit 23.

The control unit 40 can be implemented on an electronic card, for example a printed circuit board. The electronic card is called a telematic box. It can integrate other functionalities dedicated to a car rental system. By way of example, the telematic box can be used for controlling the vehicle door opening, or for recording the quantity of fuel consumed by the user, and the traveled distance. The telematic box can communicate with an on-board computer of the vehicle.

Figure 5:
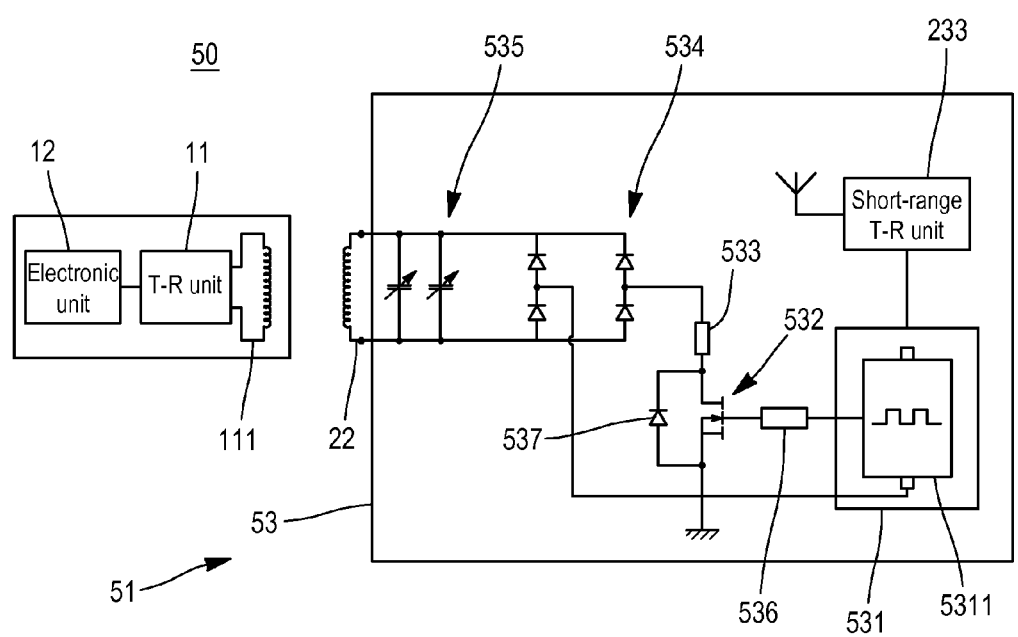
FIG. 5 represents a second exemplary embodiment of an immobiliser system according to the invention.

FIG. 5 illustrates a second embodiment of an immobiliser system according to the invention. This second embodiment lies on the property according to which the transponder 15 of the switch key 16 transmits an RF return signal to the transmitter-receiver unit 11, whose amplitude is modulated according to the identification data of the transponder 15. The identification data are so embodied in a modulating signal. This signal is typically a periodic signal whose frequency lies in the range between about 2 kHz and about 10 kHz. The immobiliser system 50 shows an identical arrangement to that of the immobiliser system 20, except that its locking device 51 comprises a different control unit. The immobiliser system 50 comprises the native components of an immobiliser system, which are an immobilisation means, not represented, a transmitter-receiver unit 11 with its native antenna 111, and an electronic unit 12. It also comprises a locking antenna 22, for example a loop antenna, and a control unit 53. The control unit 53 comprises a microcontroller 531, a controlled switch 532, a resistive load 533, a bridge rectifier 534, such as a diode bridge, and capacitive elements 535. The control unit 53 may also comprise a short range transmitter-receiver unit 233 for communicating with a decision unit 40. The microcontroller 531 forms a driving means for the controlled switch 532. It integrates a modulator 5311 for generating an amplitude modulated (AM) signal at a frequency substantially equal to the frequency of the modulating signal. The AM signal drives the controlled switch 532 via a resistor 536. The controlled switch 532 can be a MOS transistor or a bipolar transistor. It allows the two terminal ends of the locking antenna 22 to be in a short circuit configuration through the resistive load 533. The transistor 532 can be protected via a diode 537. The bridge rectifier 534 aims at causing the electrical current flowing in the same way at all time. The capacity of the capacitive elements 535 must be tuned in accordance with the resonant antenna to be obtained.

On the contrary to the first embodiment of the immobiliser system according to the invention, which impacts the RF return signal as a whole by attenuating its overall amplitude, the second embodiment of the immobiliser system involves a time dependant attenuation of the RF return signal. This makes the perturbation more efficient and/or makes possible to miniaturise the locking antenna 22.

It should be noted that the invention is not limited to the aforementioned examples. Numerous variants may be applied to the above examples without going the scope of the invention. Moreover, different characteristics, forms, variants and alternatives of the invention may be combined with one another in various combinations provided that they are not incompatible or mutually exclusive.

The invention claimed is:

1. An immobiliser system for a vehicle, comprising:
   a native transmitter-receiver unit integrated into the vehicle, said native transmitter-receiver unit including a native antenna and being configured so as to enable a wireless communication with a transponder associated with a switch key, and a locking device for allowing or preventing the wireless communication between the native transmitter-receiver unit and the transponder, said locking device comprising:

an entirely passive locking antenna arranged in the vicinity of the native antenna;

a control unit configured to control the entirely passive locking antenna in an enabled state, wherein the entirely passive locking antenna does not interfere with the wireless communication between the native transmitter-receiver unit and the transponder, or in a locking state, wherein the entirely passive locking antenna does interfere with said wireless communication; and the entirely passive locking antenna comprising a coil having two terminal ends, the control unit comprising a controlled switch connecting said terminal ends and a driving means for controlling the controlled switch in an open state or in a close state.

2. The immobiliser system of claim 1, wherein the coil of the entirely passive locking antenna is configured to act as an electromagnetic shield between the native antenna and the transponder when the controlled switch is in the close state.

3. The immobiliser system of claim 1, wherein the transponder is configured to enable the transmission of an amplitude modulated signal to the native transmitter-receiver unit, said signal being modulated according to a modulating signal characterising identification data enclosed in the transponder, the control unit being configured to close the controlled switch at a frequency substantially equal to a frequency of the modulating signal.

4. The immobiliser system of claim 1, wherein the locking device further comprises a decision unit for generating an authorisation signal, said decision unit comprising:

a user interface enabling a user of the vehicle to input an access authorisation datum; and a processing unit for generating the authorisation signal as a function of the access authorisation datum, wherein the driving means of the control unit is configured to receive the authorisation signal and to control the controlled switch as a function of this authorisation signal.

5. The immobiliser system of claim 4, wherein the decision unit further comprises a wireless transmitter for transmitting the authorisation signal, the control unit further comprising a wireless receiver able to receive the authorisation signal.

6. The immobiliser system of claim 4, wherein the user interface comprises a keypad enabling the user to enter an authorisation code, said code constituting an access authorisation datum.

7. The immobiliser system of claim 4, wherein the user interface comprises a contactless card reader capable of reading an access datum stored in a user card, said datum constituting an access authorisation datum.

8. The immobiliser system of claim 7, wherein the contactless card reader is an RFID reader or an NFC reader.

9. The immobiliser system of claim 4, wherein the decision unit further comprises a wireless receiver able to receive an access datum from a remote server, the processing unit generating the authorisation signal as a function of this access datum.

10. The immobiliser system of claim 1, wherein the entirely passive locking antenna comprises a locking coil wound around at least part of the native antenna.

11. The immobiliser system of claim 10, wherein the native antenna comprises a native coil, the locking coil of the entirely passive locking antenna being wound around at least part of the native coil.

12. The immobiliser system of claim 1, wherein the native antenna and/or the entirely passive locking antenna are loop antennas.

13. An immobiliser set for a vehicle comprising an immobiliser system of claim 1, and a switch key including a transponder, said transponder enabling a wireless communication with the native transmitter-receiver unit of the immobiliser system.

* * * * *